UNITED STATES PATENT OFFICE.

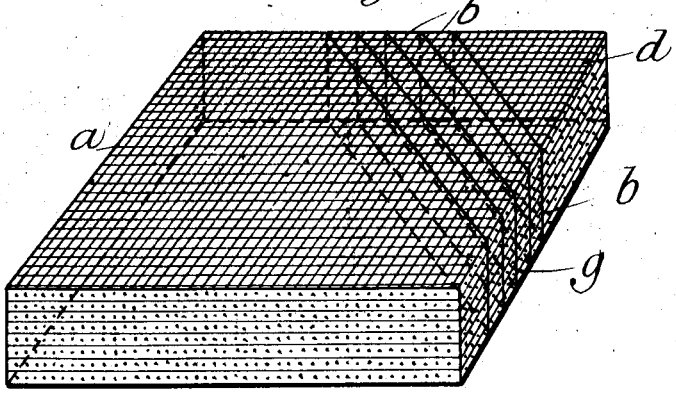
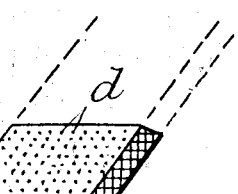
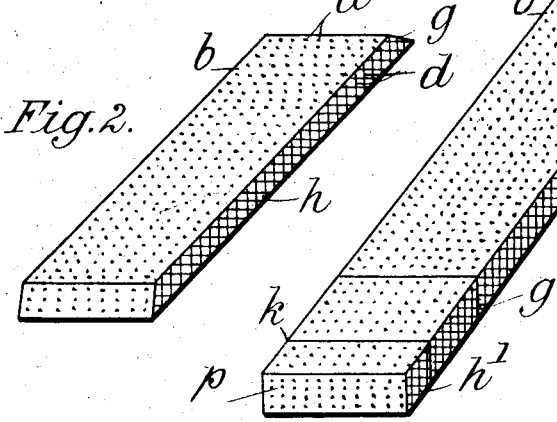
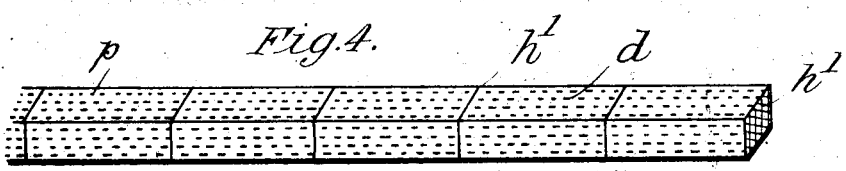

BOGUMIL NEDSELSKI, OF RIGA, RUSSIA, ASSIGNOR TO THE FIRM OF C. MEDTNER AND E. SEEGER, OF MOSCOW, RUSSIA.

COVER OR WEARING-SURFACE FOR WHEEL-TIRES AND OTHER OBJECTS EXPOSED TO WEAR.

No. 835,079.   Specification of Letters Patent.   Patented Nov. 6, 1906.

Application filed January 9, 1905. Serial No. 240,343.

*To all whom it may concern:*

Be it known that I, BOGUMIL WENZESLAWOWITSCH NEDSELSKI, a subject of the Emperor of Russia, residing at 1 Promischlennayastrasse, Riga, Russia, have invented certain new and useful Improvements in Covers or Wearing-Surfaces for Wheel-Tires and other Objects Exposed to Wear; and I do hereby declare the following to be a full, clear, and exact description of the invention, such as will enable others skilled in the art to which it appertains to make and use the same.

The object of this invention is to insure the greatest possible durability in solid india-rubber tires furnished with woven layers of thread or fiber.

India-rubber tires with embedded strips of woven material are already known in various forms. In one of these forms bands are laid parallel adjoining one another in the longitudinal direction of the strip. These bands are cut obliquely to the direction of the threads, which consequently take an oblique position in relation to the surface. Hereby, it is true, an unequal strain in the direction of the threads, as also wearing out of the upper surface, is prevented; but the wearing away of the two side surfaces is facilitated, as with constant use the woven strips which happen to lie parallel to the side surfaces of the strip become exposed and loosened. If only a few threads be loose, the surrounding layer of woven material will become loose in a short time.

In the present invention the threads of the embedded woven layers run obliquely to all four external surfaces of the tire, so that even when the tire is worn only ends of the threads become visible on the tread and on the side surfaces; but whole threads cannot possibly come out.

Referring to the accompanying drawings, Figure 1 is a perspective view of a block of superposed layers of material pressed together. Figs. 2 and 3 illustrate strips cut from the block, and Fig. 4 illustrates a further division and arrangement of the strips.

The covering is prepared in the following manner: The hairs or threads in the form of a texture covered with a thin layer of the india-rubber are firmly united with the binding material under pressure by means of a calender, a press, or the like, whereupon the layers $a$ thus obtained are laid one over the other in the desired thickness, Fig. 1. The block, Fig. 1, is now cut diagonally, so as to divide it into strips $b$, Figs. 1 and 2, which are placed one against the other by their narrow ends $g$ and firmly joined, Fig. 3. Hereby bands are formed in which the threads $d$ run obliquely to the surface with their ends showing only above and below, but completely exposed at the sides $h$. From the strips $b$ thus obtained cross-strips $p$ are cut along the line $k$ (shown in Fig. 3) and adhesively and firmly joined together by their ends $h'$, Fig. 4. In this way a tire-covering is obtained in which only the ends of the threads forming the layers are visible on all four sides, Fig. 4. The vulcanizing may be effected prior to or subsequently to the cutting.

What I claim, and desire to secure by Letters Patent, is—

A process of producing solid india-rubber vehicle-tires with inserted woven layers, consisting in embedding woven material in sheets of india-rubber, superposing the sheets to form a block, cutting the block diagonally into strips $b$, adhesively and firmly joining the ends of the strips, cutting the strips so formed transversely, and joining the resulting cut portions together by their ends to produce a tire in which the threads of the woven material run obliquely to all four external surfaces.

In testimony whereof I have affixed my signature in presence of two witnesses.

BOGUMIL NEDSELSKI.

Witnesses:
  H. W. SEDCOLE,
  VAN O'CLEMANN.